United States Patent [19]

Paton

[11] Patent Number: 5,362,078
[45] Date of Patent: Nov. 8, 1994

[54] COMBINATION SADDLE CARRIER AND RACK

[75] Inventor: H. Earl Paton, Hudson, Wis.

[73] Assignee: Paton Limited, Inc., Hudson, Wis.

[21] Appl. No.: 55,135

[22] Filed: Apr. 29, 1993

[51] Int. Cl.⁵ ............................................. B62B 1/12
[52] U.S. Cl. ............................ 280/47.18; 280/47.19;
  280/47.28; 280/47.29; 280/35; D34/26
[58] Field of Search ................... 280/35, 47.18, 47.19,
  280/47.23, 47.27, 47.28, 47.29; 211/2; D34/24, 26

[56] References Cited

U.S. PATENT DOCUMENTS

| | | | |
|---|---|---|---|
| D. 321,773 | 11/1991 | Chiang | 280/47.34 X |
| D. 327,761 | 7/1992 | Stanfield | D34/24 X |
| 2,740,532 | 4/1956 | Kleinsmith | 211/104 |
| 2,893,577 | 7/1959 | Swanson | D34/26 X |
| 2,952,366 | 9/1960 | Botten | 211/93 |
| 3,147,606 | 9/1964 | Holmberg | |
| 3,233,745 | 2/1966 | Hershberger | 211/104 |
| 3,305,101 | 2/1967 | Mills | 211/87 |
| 3,688,912 | 9/1972 | Wilmoth | 211/13 |
| 3,780,971 | 12/1973 | De Filipps | 248/309 |
| 3,785,669 | 1/1974 | Doheny | D34/26 X |
| 3,930,663 | 1/1976 | Scripter | 280/36 |
| 4,356,922 | 11/1982 | Dierksheide | 211/13 |
| 4,541,535 | 9/1985 | Bartholomew | 211/96 |
| 5,102,154 | 4/1992 | McDonald | 280/47.18 X |

FOREIGN PATENT DOCUMENTS

2377312  9/1978  France .............................. 280/47.28

OTHER PUBLICATIONS

Schneider's Saddlery 1993 Catalog, Oct. 1992, p. 107—Top photo item A; Bottom photo items A, B, C, D, & E.
Mills Fleet Farm Newspaper Insert Advertisement, Feb. 14, 1992, Hand Truck photo in top right quadrant of p. 7.
Schneider's Saddlery Co., Inc. 1993 Catalog; Oct. 1992, p. 102—bottom photo item J.

*Primary Examiner*—Brian L. Johnson
*Attorney, Agent, or Firm*—Amy J. Hoffman; Robert A. Elwell; Jennifer K. Farrar

[57] ABSTRACT

An equestrian saddle carrier for transporting one or more saddles includes a frame having a vertical portion defining a forward side and a rearward side and a horizontal portion extending from the forward side of the vertical portion. An axle is offset from the carrier frame on the rearward side and accepts at least one wheel. A height adjustable saddle arm attachment system is connected to the frame allowing saddle arms to detachably connect and extend on the forward side of the frame. A saddle rack, for use alone or in combination with the saddle carrier, includes a frame having a vertical portion with a forward and rearward side and a horizontal portion extending from the forward side of the vertical portion. The saddle rack may be slidably engaged by the horizontal portion of the saddle carrier beneath the horizontal portion of the saddle rack. Detachable saddle arms interchangeably connect to the vertical portions of the rack and the carrier.

21 Claims, 10 Drawing Sheets

COMBINATION SADDLE CARRIER AND RACK

FIELD OF THE INVENTION

The present invention generally relates to carts and to free standing, article supporting racks. The invention more specifically relates to racks and carriers which may function alone or may function in combination. In particular, the present invention relates to a storage rack and carrier suitable for simultaneously transporting and storing more than one equestrian saddle and accessories.

BACKGROUND OF THE INVENTION

Equestrian saddles are expensive articles which require significant care during transport and storage. Saddles are made of leather which is a pliable material with a tendency to mold to the shape of its support. If a saddle is supported or laid on a flat surface for a lengthy amount of time, the saddle becomes deformed and unsuitable for placing on a horse's back. Therefore, care must be taken to store expensive equestrian saddles in a position suitable for the saddle. In the case of equestrian saddles, an ideal storage or support device mimics the shape of the animal's back.

Saddle racks are known in the art. For example U.S. Pat. Nos. 4,541,535, 4,356,922, 3,780,971, 3,688,912, 3,305,101, 3,233,745, 2,952,366, and 2,740532 each disclose a hangar or rack suitable for accepting equestrian saddles. All of the racks generally resemble each other and attempt to simulate the ideal support form (i.e., a horse's back). Generally, these patents disclose a tubular member which is bent into a "U" shape. The free ends of the "U" attach to a wall thus providing a horizontal support member suitable for accepting a saddle. Any of these devices would retain the ideal shape of a saddle placed or stored upon it for any length of time. However, each of these patents provides only a stationary rack.

Another difficulty in dealing with equestrian saddles is transporting them. Due to their shape which includes a bulky seat encumbered with long pendular stirrups and straps, equestrian saddles are cumbersome and difficult to transport. Additionally, saddles are heavy. For example, a typical western saddle weighs in the range of about 35 to 40 pounds but some variants can weigh up to about 70 pounds or more depending upon ornamentation. The excessive weight adds to the difficulty of transporting saddles and makes the saddles even more unwieldy. U.S. Pat. No. 3,939,663 discloses a saddle carrier which transports an equestrian saddle without deforming its shape.

Although the '663 patent in part overcomes transportation problems, the carrier does not address another set of concerns present when transporting equestrian and their gear. Namely, the '663 carrier is only useful for transporting one saddle at a time. Oftentimes owners need to transport more than one saddle when travelling to a remote show with more than one horse. Moreover, the '663 patent only discloses a transport device to use this as a storage article is wasteful of space and therefore inefficient. A saddle carrier is needed which is suited for transporting and storing more than one saddle.

The present invention addresses the needs of transporting more than one saddle at a time and provides a combination equestrian saddle rack and carrier. The inventive device is characterized by dual functionality. First, it operates as one unit, and second, it also separates into two units. One unit can transport at least two saddles and another unit, which is a stationary rack, can also accept at least two saddles.

SUMMARY

The present invention includes a combination saddle carrier and rack. When fully engaged the carrier and rack operate as one unit which is capable of transporting more than one saddle simultaneously while maintaining the shape of each saddle. An important feature of the present invention is that it is separable and can operate as two units. The first unit is a saddle carrier useful for transporting both saddles and/or the saddle rack. The second unit is a saddle rack which alone is a stationary unit but when engaged with the saddle carrier becomes mobile. Detachable saddle arms operate to receive saddles for transport and storage on both the saddle carrier and the saddle rack.

DETAILED DESCRIPTION OF THE INVENTION

Figure 1:
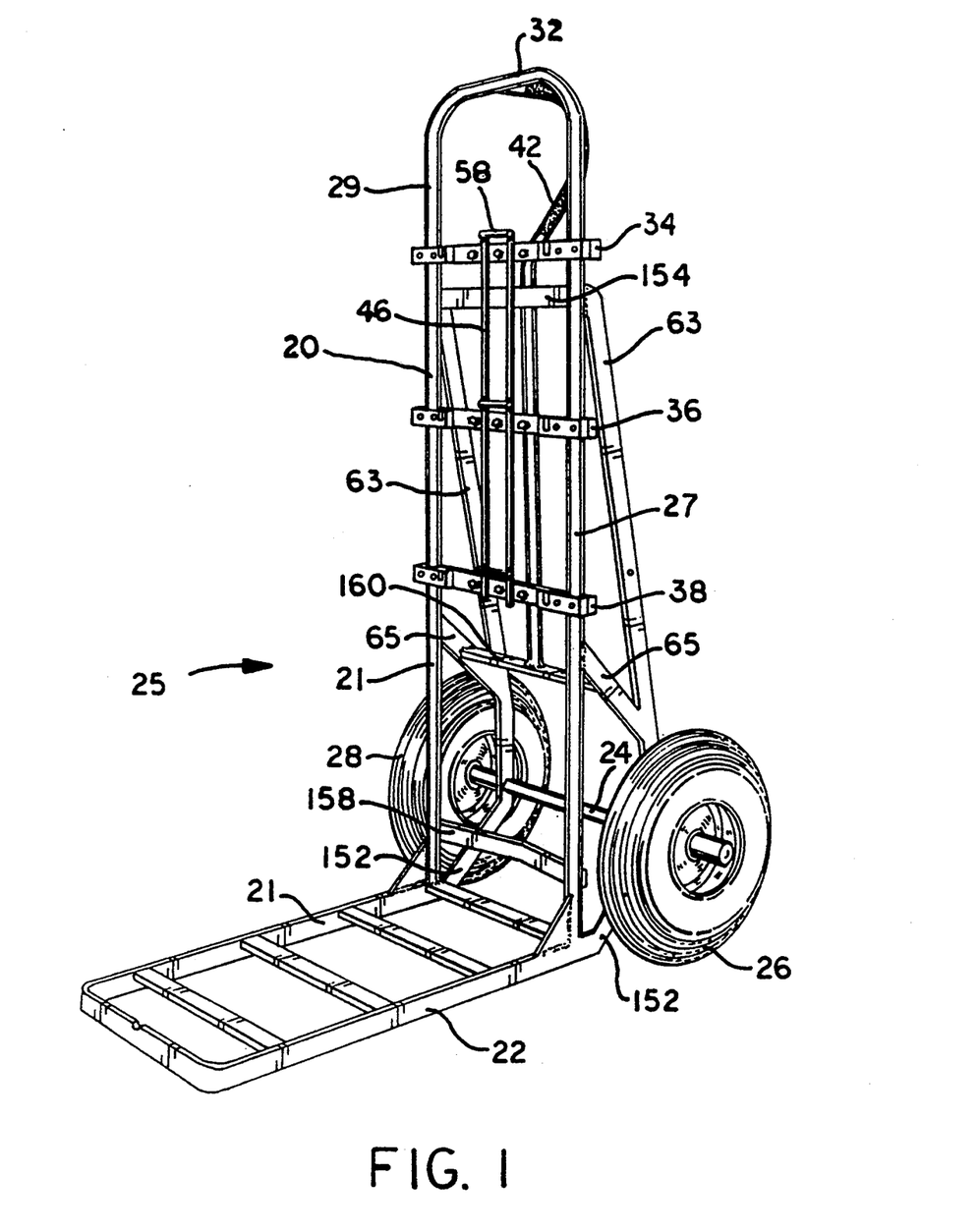
FIG. 1 is a perspective view of an equestrian saddle carrier.
Figure 5:
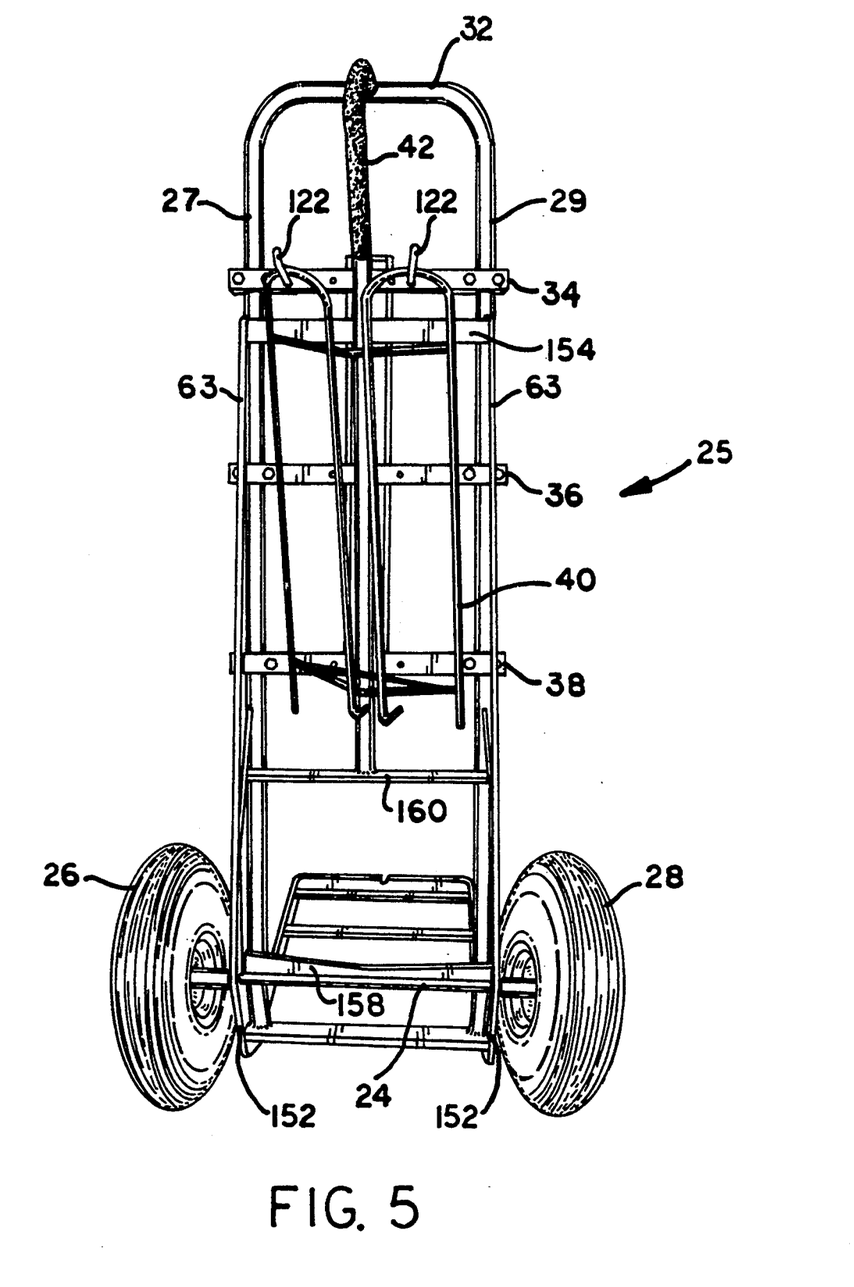
FIG. 5 is a rear view of an equestrian saddle carrier with a saddle arm hanging therefrom for storage.
Figure 6:
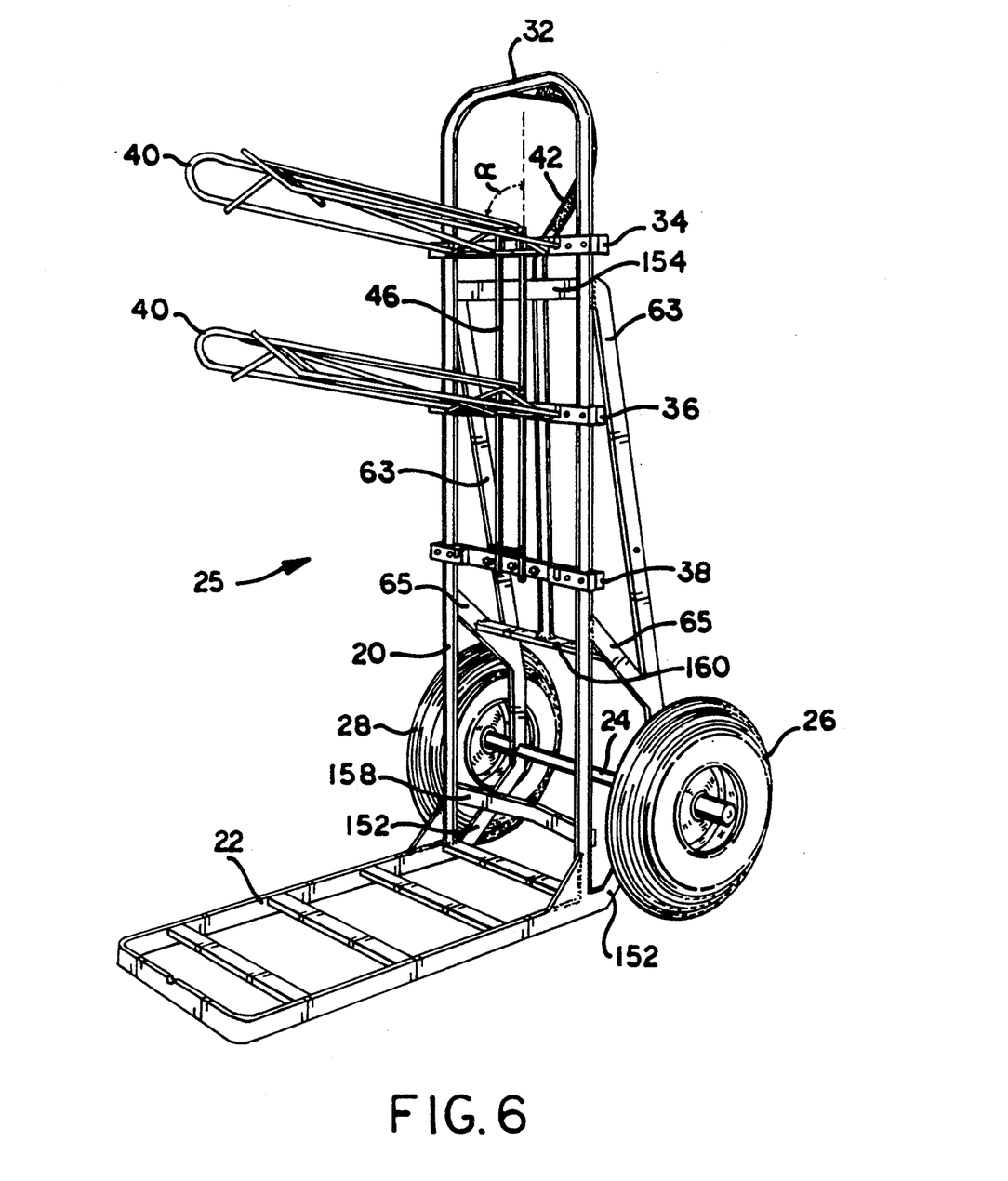
FIG. 6 is a perspective view of an equestrian saddle carrier with saddle arms extending therefrom.

A saddle carrier of the invention is shown in FIGS. 1, 5 and 6 and is generally referred to as 25. The carrier 25 includes a frame 21 having a vertical portion 20 which defines a forward and a rearward side. A horizontal portion 22 extends from the forward side of the vertical portion 20. An axle 24 is offset from the rearward side of the vertical 20 and horizontal 22 portions of the frame 21. The axle 24 supports at least one wheel 26 but preferably supports a pair of wheels 26 and 28 in order to stabilize movement of the carrier 25.

A feature of the invention is the offsetting of the axle 24 from the frame. Wheels 26 and 28 are mounted on the axle 24. Offsetting the axle 24 ensures that the wheels 26 and 28 do not interfere with the engagement of the carrier 25 with the rack which is shown generally in FIG. 2 as 30. Additionally, the offset wheels 26 and 28 do not interfere with saddles which are transported on the carrier 25.

Figure 10:
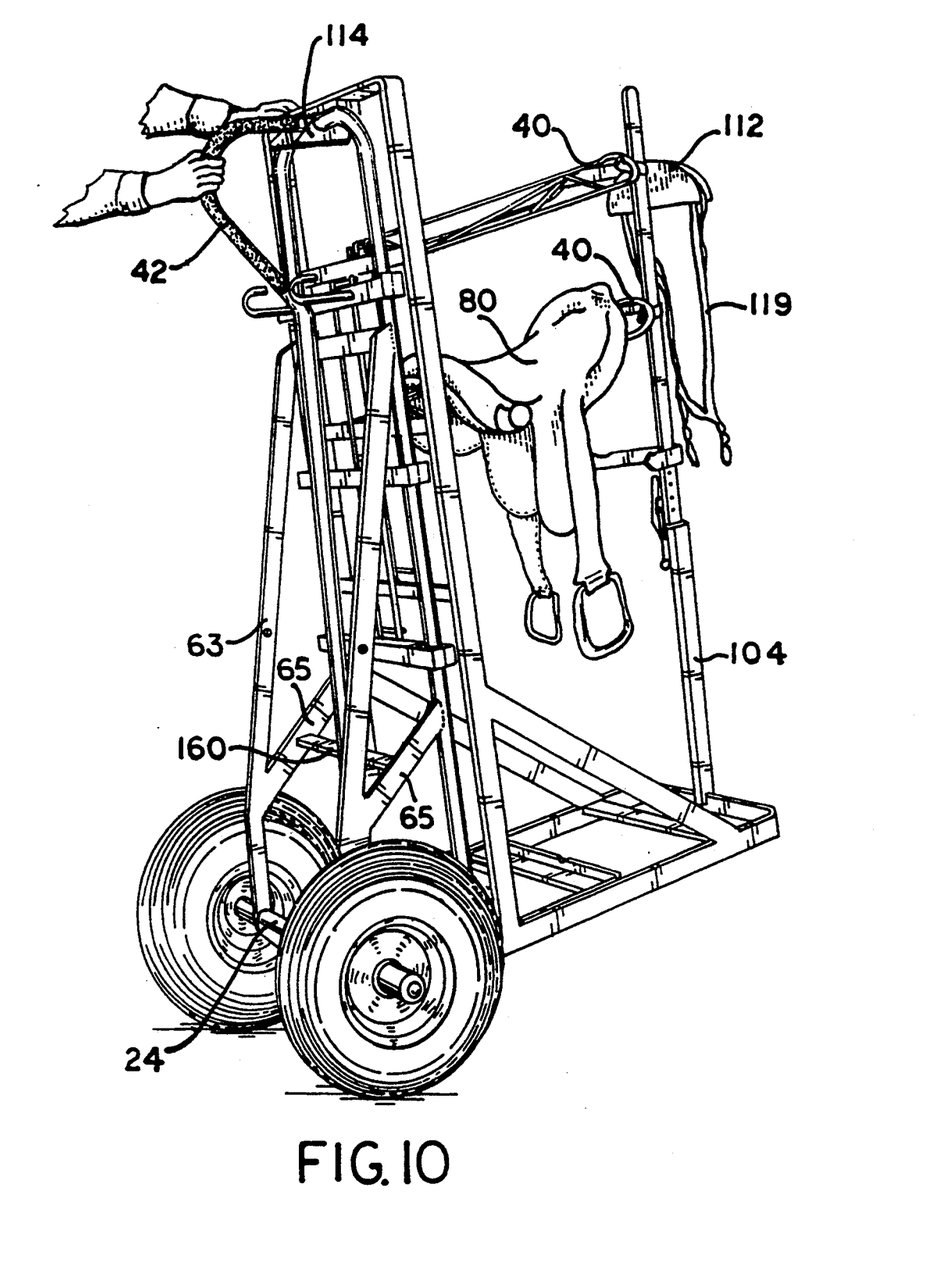
FIG. 10 is a perspective view of a fully engaged saddle carrier and saddle rack with a saddle resting upon one of the saddle arms.

Another important advantage of offsetting the wheels 26, 28 is the leverage which is obtained with this construction. In order to transport the carrier, one must lift the horizontal portion 22 of the carrier 25 off the ground. This is accomplished by tilting the top of the vertical portion 20 of the carrier 25 rearwardly and pivoting the frame 21 upon the wheels 26, 28 which is shown in FIG. 10. Preferably, to facilitate tilting into a mobile orientation, one may place a foot upon the axle 24, thereby preventing the offset axle and wheels from moving rearward, while at the same time pulling back on the vertical portion 20 of the carrier 25.

The axle 24 is preferably offset from the frame 21 of the carrier 25 by a pair of axle support bars 63 which extend rearwardly away from the vertical portion 20 of the carrier 25. Another pair of bars 65 and gussets 152 buttress the axle support bars 63 providing additional support for the axle 24.

Beyond providing a means for offsetting the axle 24, bars 63, 65 and gussets 152 more importantly provide a feature necessary for the operability of the carrier 25. Cross bars 154 and 160 in combination with support bars 63, buttress bars 65, and gussets 152 provide a rear support system which prevents the vertical portion of the carrier 20 from bending forward when the carrier is loaded with saddles.

Gussets 152 are very sturdy due to their short length. The gussets are strategically placed to couple support of the rear support system with the horizontal portion 22. Gussets 152, in combination with the rear support system of the vertical portion 20, allow lifting of the horizontal portion 22 without bending or changing the integrity of the frame 21.

Axle 24 is preferably comprised of a hollow outer shaft which is fixedly secured to the carrier 25 frame at bars 63. Thus, the hollow shaft also acts as a cross support for the rear support system. The hollow portion of the axle 24, along with bars 154, 158, and 160 create a very sturdy cross support for the rear support system. Due to this extensive cross support, the vertical portion 20 of the carrier can withstand considerable abuse. Even a jarring side blow would not cause the vertical portion to twist or bend.

The hollow shaft telescopically accepts a rod. The rod extends beyond the length of the hollow shaft and accepts wheels on both ends of the axle. Thus, the rod and attached wheels are free to rotate within the hollow shaft.

Dollies, as are commonly know in the art do not require this rear support system because the load is generally only placed on the base or horizontal portion of the dolly. Dollies are, therefore, not equipped to transport a load suspended from the vertical portion. Without the rear support system of the present invention the vertical portion 20 of the carrier 25 would likely crumble when saddles are suspended from the vertical portion 20.

Cross bars 154 and 160 are multi-functional. The bars 154 and 160 provide a lower attachment site for the handle 42. The bars 154 and 160 also prevent twisting of the vertical bars 27 and 29 which might occur when transporting a saddle-laden carrier 25. Additionally, the bars 154 and 160 provide cross support for the rear support system described above.

In another embodiment, the axle 24 is not offset rearwardly from the frame but rather is positioned in the same plane as the vertical portion 20. The wheels 26 and 28 are spaced apart or offset from the frame 21 by placing the wheels 26 and 28 to the outside of the horizontal portion 22 such that the wheels 26 and 28 do not interfere with the saddles or the engagement of the rack 30 with the carrier 25.

A handle 42 is optionally but preferably connected to the rearward side of the vertical portion 20 of the saddle carrier 25. The handle 42 is formed of any sturdy material and preferably is formed of metal tube. If a handle 42 is not provided on the carrier 25, the horizontal cross bar 32 of the vertical portion 20 is easily used as a means to grasp and steer the carrier 25.

The vertical portion 20 of the saddle carrier frame 21 is preferably formed of a single piece of metal which is bent to form a first vertical bar 27, a horizontal cross bar 32, and a second vertical bar 29. Horizontal support bars 34, 36, and 38 extend between the first 27 and second 29 vertical bars providing support for the vertical portion 20 of the carrier 25 and also providing a means to attach saddle arms 40 to the saddle carrier 25.

Horizontal support bars 34, 36 and 38 are connected by a ladder-like piece 46 which is preferably spot-welded to the horizontal support bars 34, 36, and 38. This ladder-like piece 46 serves two functions. First, it maintains the horizontal support bars 34, 36 and 38 in spaced apart arrangement and second, it in part provides an attachment means for accepting the saddle arms 40.

Figure 12:
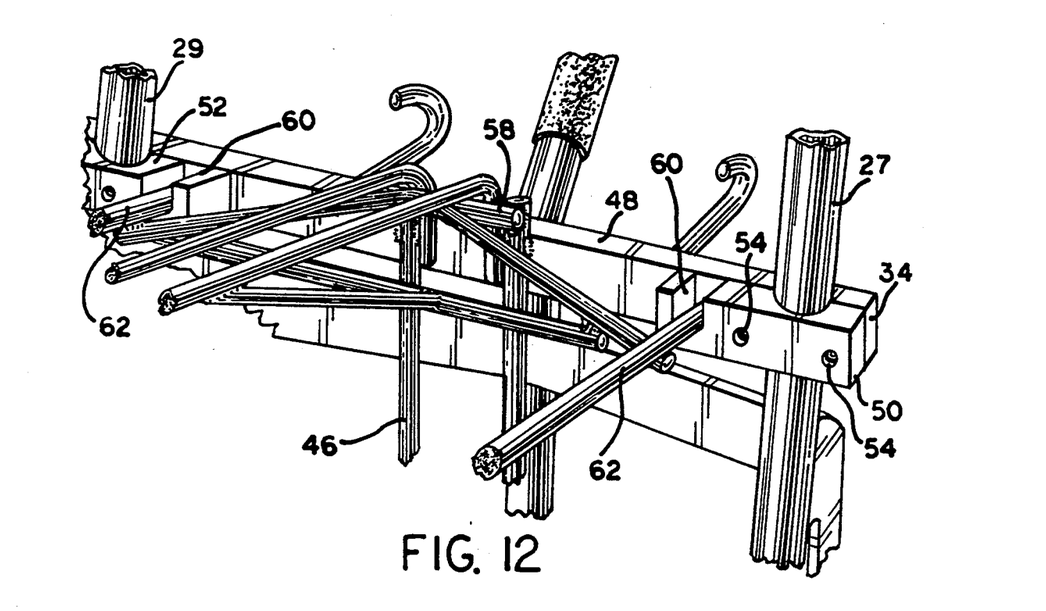
FIG. 12 is an enlarged view of the saddle carrier showing the attachment of a saddle arm to the carrier.

As shown best in FIG. 12, the horizontal support bars 34, 36 and 38 are each comprised of three sections, a rear bar 48 and two forward sections 50 and 52. The horizontal support bar 34 is attached to the first 27 and second 29 vertical bars by placing the rear bar 48 on the rear side of the vertical bars 27 and 29 and placing a front section 50 or 52 on the forward side of each of the vertical bars 27 and 29. The forward section 50 or 52 is then bolted to the rear bar 48 with bolts 54 such that the forward section 50 or 52 and rear bar 48 and bolts 54 surround the first 27 and second vertical bar 29. The bolts 54 secure the horizontal support bar 34 so that it cannot slide along the vertical bars 27 and 29, thereby maintaining the horizontal support bar 34 in position to accept a saddle arm 40. Horizontal support bars 36 and 38 have the same structure and attachment to the frame 21 as bar 34.

The structure of the horizontal support bars 34, 36 and 38 and the means of attachment to the vertical bars 27 and 29 allow height adjustment of the horizontal support bars. This is particularly important because the support bars 34, 36 and 38 provide an attachment means for accepting the saddle arms 40. Thus, by adjusting the height of the horizontal support bars 34, 36 and 38 one adjusts the height of the saddle arms 40. If a tall person is using the saddle carrier 25, the horizontal support bars 34, 36, and 38 are raised adjacent to the horizontal cross bar 32. Conversely, if a short person is using the saddle carrier 25, the horizontal support bars 34, 36 and 38 are lowered.

Figures 3, 4:
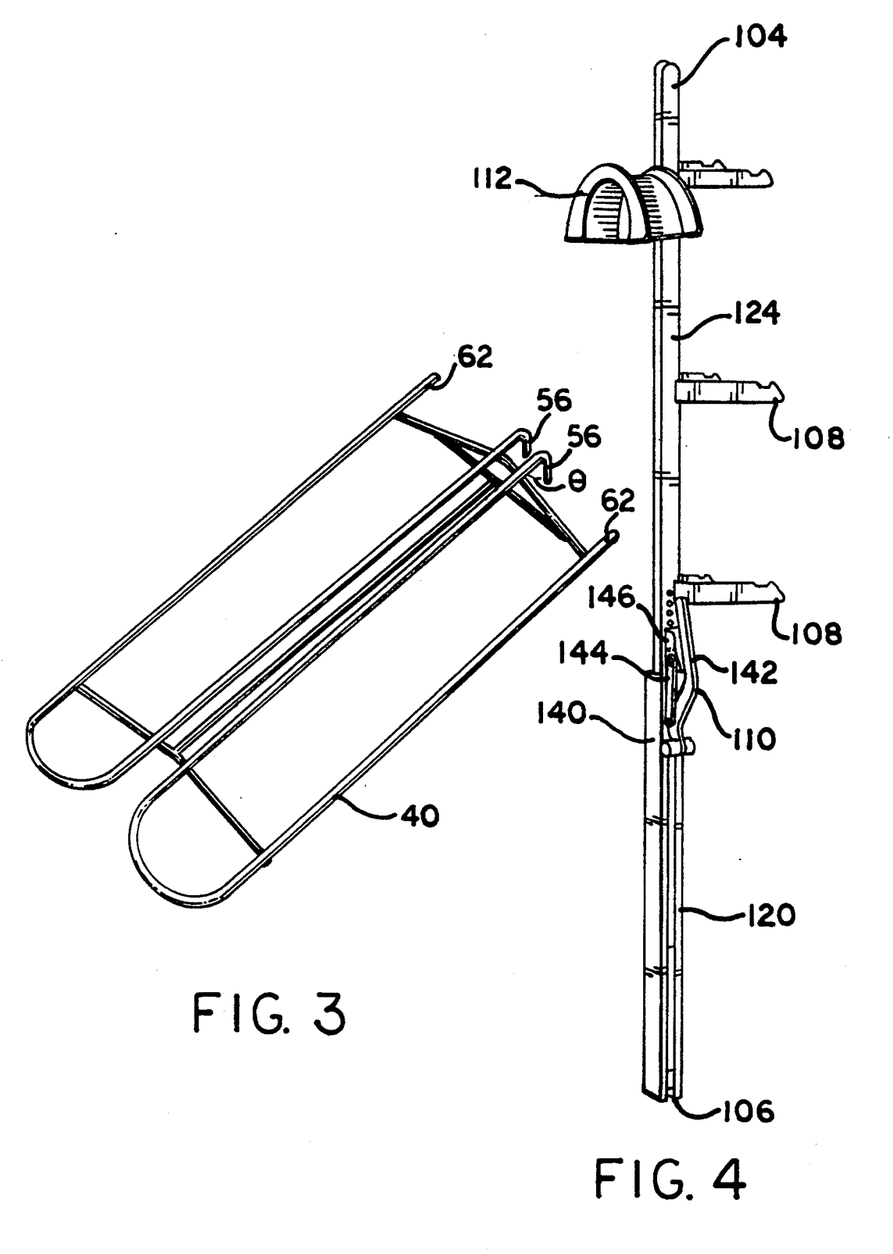
FIG. 3 is a perspective view of a saddle arm.
FIG. 4 is a perspective view of a support post.

The saddle arms 40 are all identical and are interchangeably used on either the saddle carrier 25 and/or on the saddle rack 30. An unattached saddle arm 40 is shown in FIG. 3. Two central prongs 56 are bent downwardly. These prongs are inserted between one of the rungs 58 on the ladder-like portion 46 and the rear bar 48 of a horizontal support bar 34. Each of the forward sections 50, 52 of the horizontal support bar 34 is notched 60 so that the notches 60 can accept the straight ends 62 of the saddle arms 40. The saddle arms 40 rest securely on the horizontal support bar 34 and the rung 58 of the ladder-like portion 46 and are ready to accept a saddle. FIG. 10 shows a saddle 80 placed upon a saddle arm 40.

Preferably, the prongs 56 of the saddle arms 40 are bent so that the angle Θ is an obtuse angle. If Θ is a 90° angle or less, the saddle arms 40 extend at a 90° angle from the vertical portion 20 of the carrier 25 or tilt below the horizontal. Preferably, when assembled with the carrier 25 as shown in FIG. 6 or rack 30, the saddle arms 40 are at an angle such that the angle α is an acute angle. As shown in FIGS. 6, 7, 8, 9 and 10, this raises the free end of the saddle arm 40. Due to the angle of the saddle arm 40, the weight of a saddle 80 is shifted toward the frame of either the carrier 25 or the rack 30. This localizes the weight of the saddles near the frame and eases transport of the saddle carrier 25.

Figure 9:
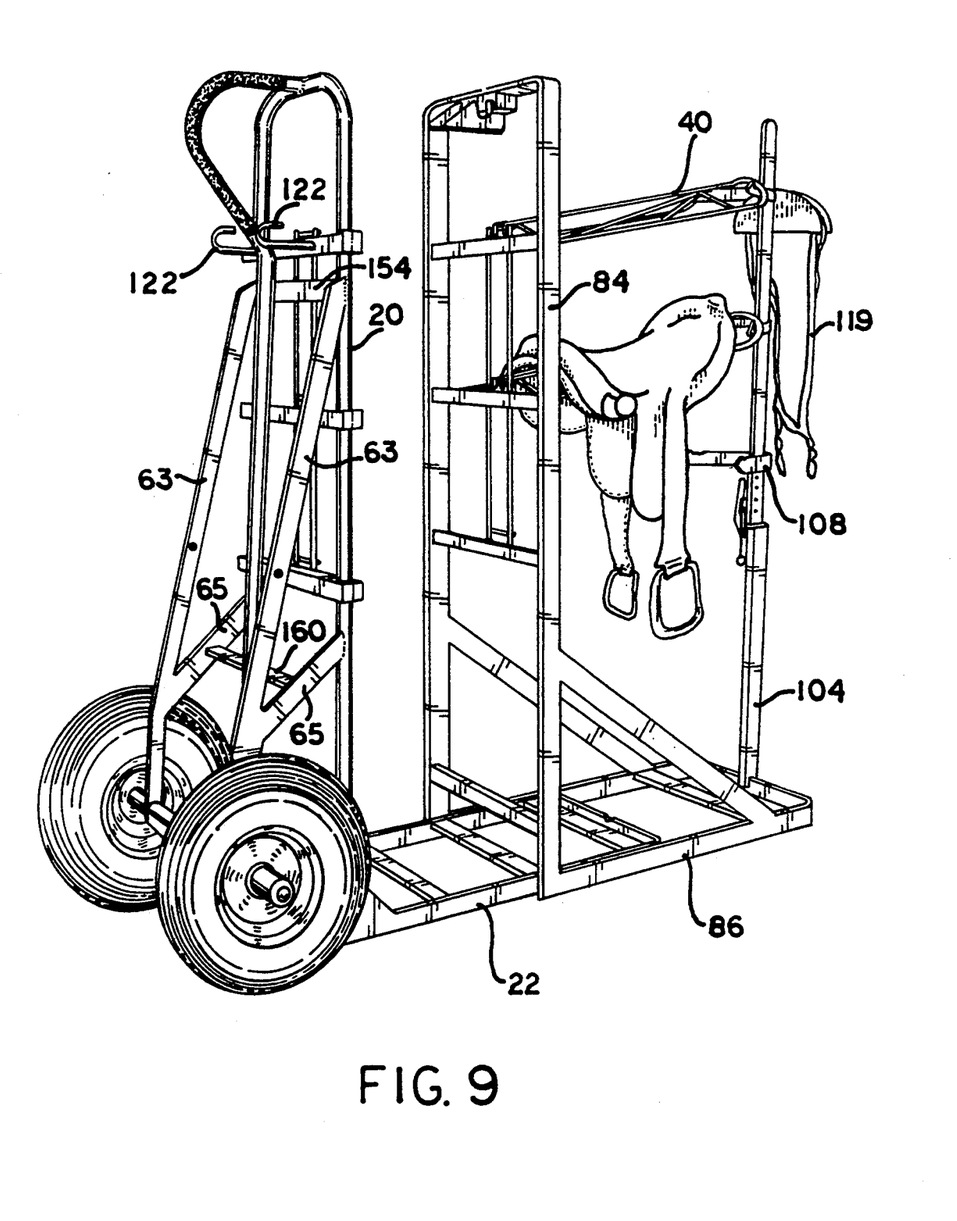
FIG. 9 is a perspective view of a partially engaged saddle carrier and saddle rack with a saddle placed upon one of the saddle arms.

Optionally, the saddle carrier 25 is fitted with a pair of hooks 122 shown in FIGS. 5, 9 and 10. These hooks 122 provide a place to hang saddle arms 40 when not in use. FIG. 5 illustrates a saddle arm 40 hanging from the hooks 122.

Cross bar 158 is placed near the bottom of the vertical portion 20. Cross bar 158 extends between vertical bars 27 and 29 and provides a means for transporting equestrian gear other than saddles. Bales of hay, pails or tack boxes to name a few items can be placed on the horizontal portion 22 of the carrier 25. Cross bar 158 provides a stop which prevents items from sliding rearwardly into the axle 24, during transport of the carrier 25.

Figure 2:
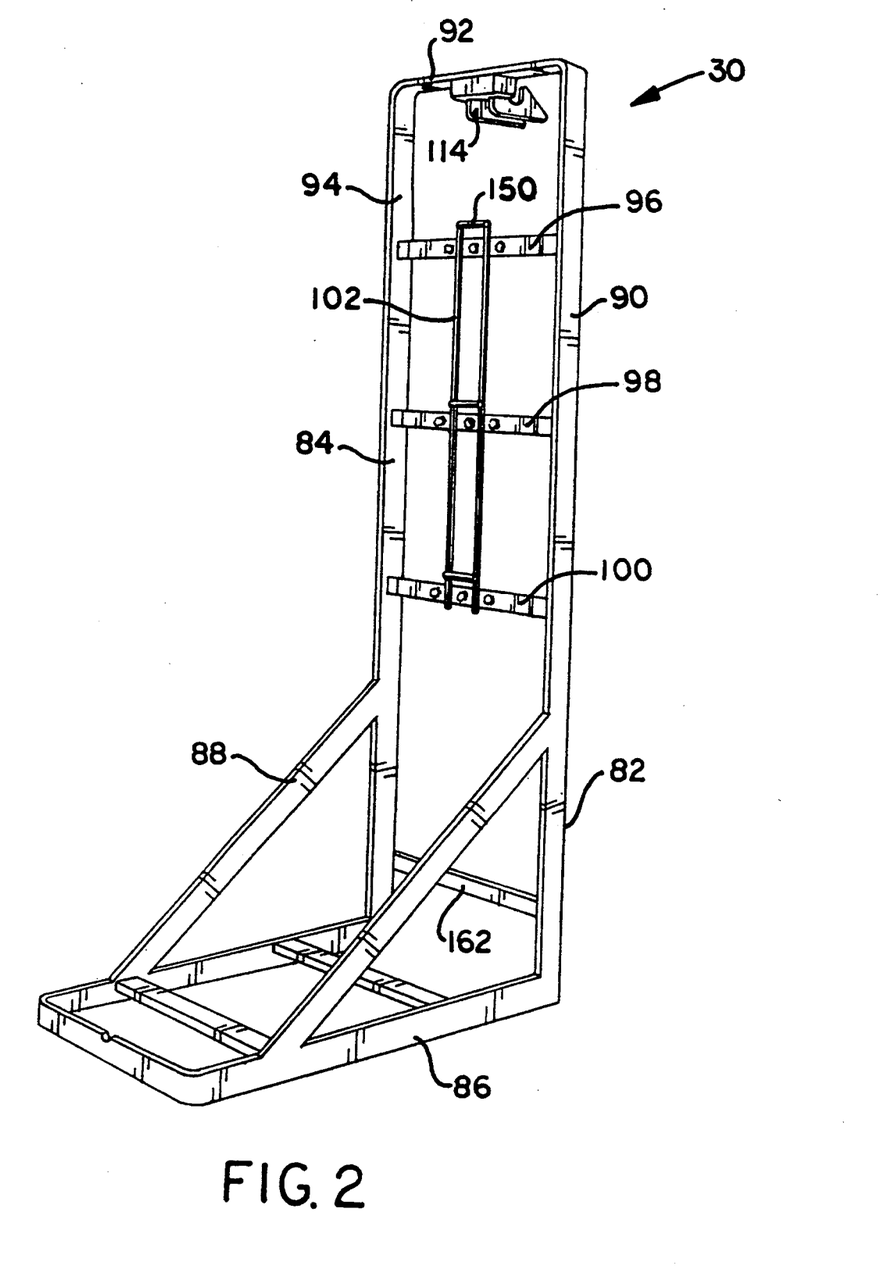
FIG. 2 is a perspective view of an equestrian saddle rack.
Figure 7:
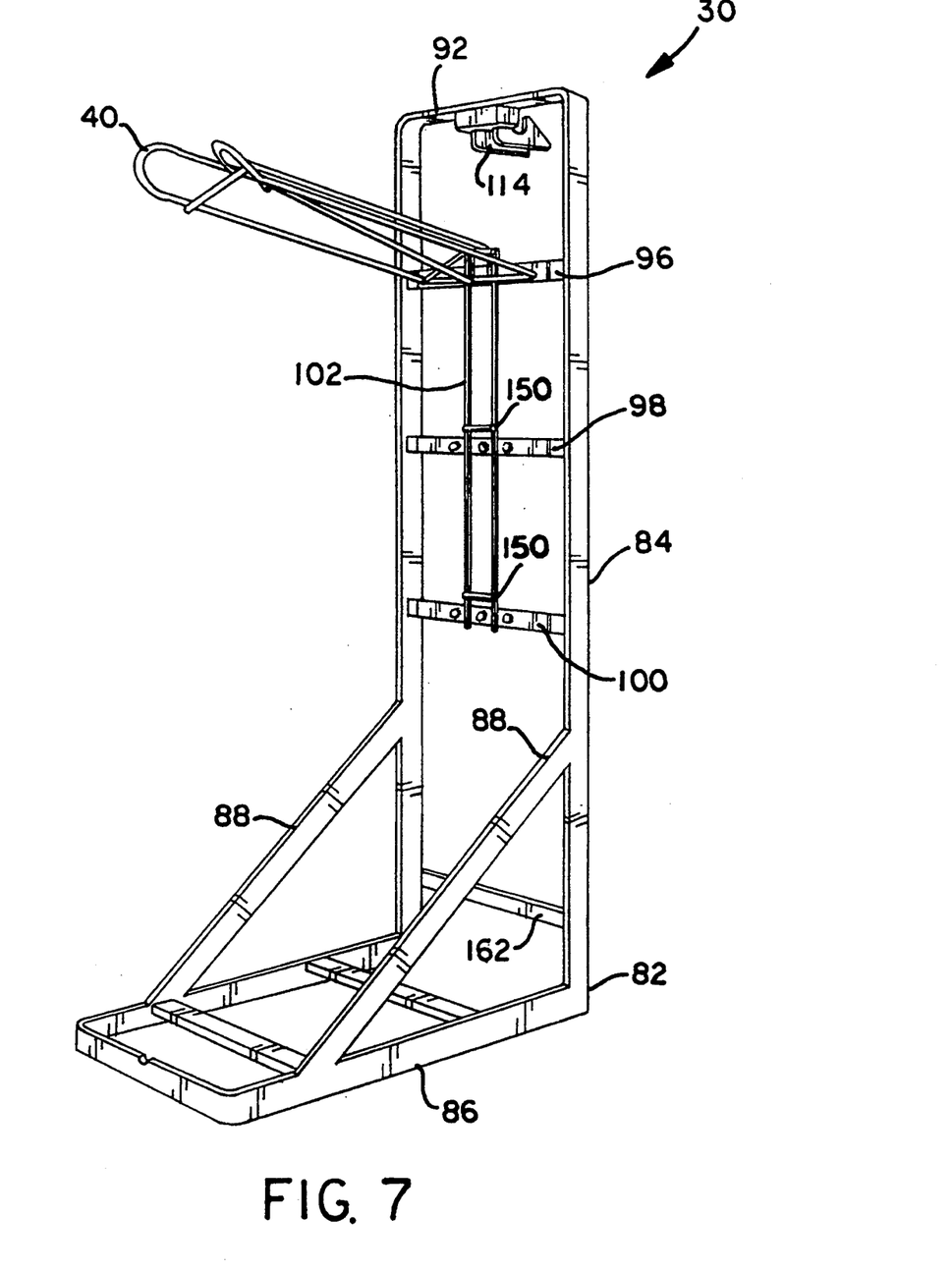
FIG. 7 is a perspective view of an equestrian saddle rack with a saddle arm extending therefrom.
Figure 8:
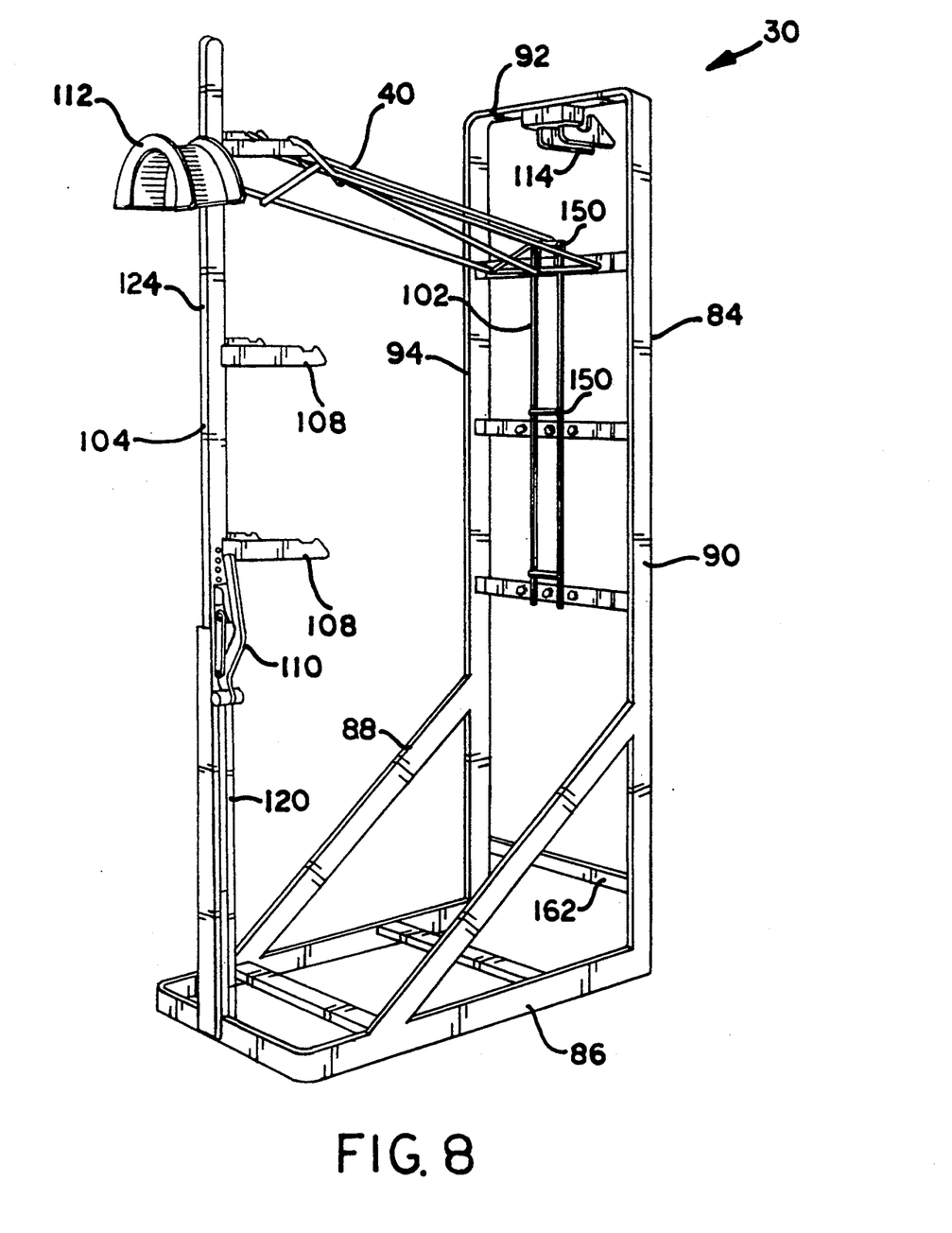
FIG. 8 is a perspective view (similar to FIG. 7) and further shows a support post.

The saddle rack 30 of the invention is shown in FIGS. 2, 7, and 8. Construction of the saddle rack 30 is similar to that of the saddle carrier 25. The rack is comprised of a frame 82 having a vertical portion 84 defining a forward and a rearward side. A horizontal portion 86 extends from the forward side of the vertical portion 84. A diagonal support bar 88 extends between the vertical portion 84 and the horizontal portion 86 of the rack 30. Diagonal support bar 88 provides additional support and ensures that the vertical portion 84 of the rack does not bend forward when saddles are placed on the saddle support arms. Diagonal support bar 88 on the rack is the functional counterpart of the rear support system found on the carrier 25.

The vertical portion 84 of the rack frame 82 is preferably formed of a single piece of metal which is bent to form a first vertical bar 90, a horizontal cross bar 92 and a second vertical bar 94. Horizontal support bars 96, 98 and 100 bridge the first and second vertical bars 90 and 94 both providing support for the vertical portion 84 and providing a means to attach saddle arms 40 to the saddle rack 30.

Horizontal support bars 96, 98 and 100 are connected by a ladder-like piece 102 which is preferably spot-welded to the horizontal support bars 96, 98 and 100. This ladder-like piece 102 serves the function of providing an attachment means for accepting the saddle arms 40. Unlike the horizontal support bars of the saddle carrier 25, the horizontal support bars 96, 98 and 100 of the saddle rack 30 are preferably each formed of a single piece of metal and are not height adjustable. Therefore, the horizontal support bars 96, 98 and 100 are permanently fastened to the first 90 and second 94 vertical bars of the saddle rack 30.

Cross bar 162 is added to provide a means to stop goods such as bales of hay and buckets which are transported on the horizontal portion 86 of the saddle rack when transported in combination with the carrier. Cross bar 162 on the rack is the functional equivalent of bar 158 found on the carrier 25 and described fully above.

As described earlier, the saddle arms 40 are interchangeable and are used on either the saddle rack 30 or saddle carrier 25. Attaching the saddle arms 40 to the saddle rack 30 is similar to attaching the saddle arms 40 to the saddle carrier 25. However, the actual attachment of the arms 40 with the rack 30 is somewhat different than the attachment of the arms 40 with the carrier 25. As previously pointed out, the horizontal support bars 96, 98 and 100 of the rack 30 are each formed of a single piece of metal. The horizontal support bars 96, 98 and 100 of the rack 30 therefore do not have the notches 60 which are present on the horizontal support bars 34, 36 and 38 of the carrier 25.

In order to place the saddle arms 40 on the saddle rack 30, the prongs 56 are placed between a rung 150 of the ladder-like piece 102 and a horizontal support bar 96. The straight ends 62 of the saddle arms 40 abut the horizontal support arm 96 and the saddle arm 40 rests securely against the horizontal support bar 96 and the rung 150 of the ladder-like piece 102. FIG. 7 shows a saddle arm 40 placed on the saddle rack 30 ready to receive a saddle.

Figure 11:
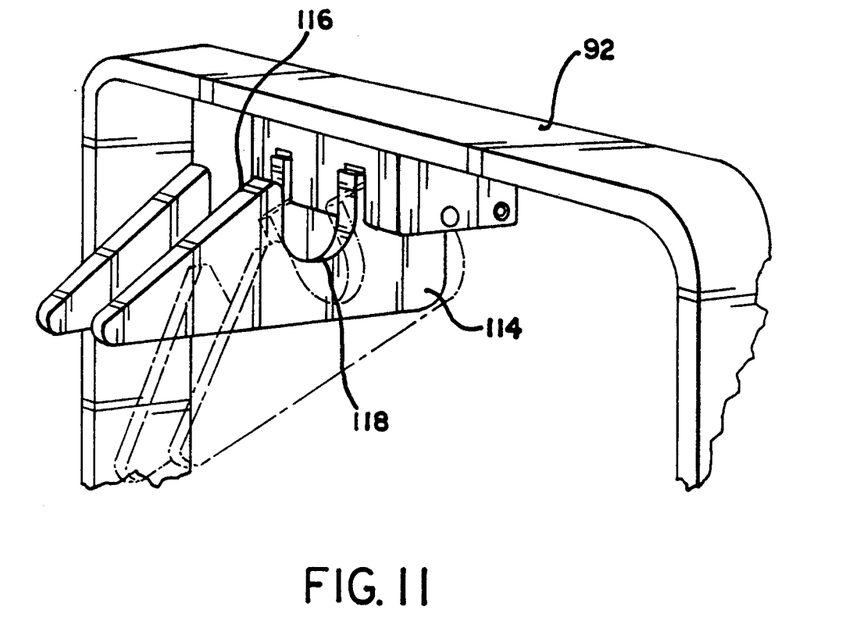
FIG. 11 is a perspective view of the locking mechanism of the saddle rack and carrier.

A locking mechanism 114 is attached to the horizontal cross bar 92 of the saddle rack 30. An expanded view of the locking mechanism 114 is shown in FIG. 11. The locking mechanism 114 comprises at least one outwardly projecting finger 116 which is pivotally mounted to the horizontal cross bar 92 allowing the finger to pivot up and down. The locking mechanism finger 116 contains a U-shaped cut 118 preferably upward opening which is suited to accept the horizontal cross bar 32 of the saddle carrier 25. The pivotal mounting of the locking mechanism 114 to the horizontal cross bar 92 allows it to pivot downwardly as shown by the broken lines. In order to accept the horizontal cross bar 32 of the saddle carrier 25, the locking mechanism finger 116 must pivot downwardly. Once the carrier 25 has fully engaged the rack, the finger 116 is free to pivot upwardly to secure the horizontal cross bar 32 of the carrier in the U-shaped cut 118, thereby securing the carrier 25 with the rack 30.

Although one may recognize that the locking mechanism 114 is also functional when placed on the saddle carrier 25, it is preferred to place the mechanism 114 on the rack 30. This arrangement allows operation of the saddle carrier 25 without interference with the locking mechanism 114.

A support post 104 is provided which is shown in FIGS. 4, 8, 9 and 10. The post 104 is placed either on the horizontal portion 22 of the saddle carrier 25 or on the horizontal portion 86 of the saddle rack 30. The base of the post 104 contains a notch 106 which easily accepts the horizontal portion 22 or 86. Horizontally projecting fingers 108 extend outwardly from the support post 104 to accept the saddle arms 40. During vehicular transport of the saddle rack 30 and/or carrier 25, the saddle arms tend to oscillate, causing an irritating noise and stressing the support. The support post 104 provides additional support to the saddle arms 40 loaded with saddles 80 and eliminates the jiggling which also eliminates the noise created by vehicular movement of the invention. However, it should be noted that use of the support post 104 is entirely optional. This is because, in the preferred embodiment, the saddle arms 40 and carrier and rack are sturdy enough to support saddles 80 without the additional support of the post 104.

The support post 104 is preferably a telescoping post and is shown at its full height in FIG. 8. The bottom portion 120 of the post 104 is hollow and telescopically accepts the top portion 124 of the post 104. At rest, the post 104 is shorter than shown in FIG. 8 because the top portion 124 of the post slides inside the hollow bottom portion 120. Due to the reduced height, the projecting fingers 108 of the post 104 do not reach the saddle arms 40.

An over-center latch 110 is provided which extends or retracts the post 104. The lever 142 of the latch 110 is pivotally connected to the bottom portion 120 of the post 104 at 140. A bar 144 is pivotally connected to the lever 142 and to a protrusion 146 which is fixedly secured to the top portion 124 of the post 104.

Flipping the lever 142 upwardly causes the bar 144 to push upwardly on the protrusion 146 secured to the top portion 124 of the post thereby causing the top portion 124 to slide upwardly. This extends the total height of the post 104. Reversing this motion by flipping the lever 142 down retracts the top portion 124 of the post 104 into the hollow bottom portion 120.

The latch 110 is an over-center latch and it is over center in its upright position as shown in FIG. 4. Thus, the latch 110 locks into place in the upward position shown in FIGS. 4, 8, 9 and 10 preventing the support post 104 from retracting.

Another feature of the latch 110 of the support post 104 is that it is easily disassembled and reassembled to accommodate either a right or left-handed person. As described, the latch is pivotally connected to the protrusion 146. A screw connects the protrusion 146 to the top portion 124 of the post 104. This screw is easily unscrewed causing disassembly of the protrusion 146 from the top portion 124 of the post 104. The top portion 120 of the post 104 is then telescopically removed from the bottom portion 120 of the support post 104. Next, the bottom portion 120 of the post 104 along with the latch 110 is rotated 180° on its vertical axis. After this, the top portion 124 is inserted into the bottom portion 120 and the post 104 is fully reassembled. The protrusion 146 is then secured onto the top portion 124 of the post 104 with a screw. Note that the protrusion 146 along with the remainder of the latch 110 is now on the opposite side of the top portion of the post 104 than it was formerly.

The support post 104 further includes an optional horseshoe-shaped rack 112 which preferably is mounted near the top of the support post 104. The horseshoe-shaped rack 112 is preferably mounted on the opposite side of the support post 104 as the fingers 108. One may store riding tack 119 on the horseshoe-shaped rack 112 as shown in FIGS. 9 and 10.

An important feature of the present invention is the combination of the saddle carrier 25 and saddle rack 30. FIG. 9 shows a saddle rack 30 partially engaged with a saddle carrier 25. As is best shown in FIG. 9, the horizontal portion 22 of the saddle carrier 25 is inserted underneath horizontal portion 86 of the saddle rack 30. This action is similar to a forklift. The carrier 25 is slid underneath the rack 30 until the vertical portions 20 and 84 of the carrier 25 and rack 30 are in contact. Ideally, the horizontal portion 86 of the rack 30 is wider than the horizontal portion 22 of the saddle carrier 25. With this construction the carrier 25 horizontal portion 22 fits inside and underneath the rack 30 horizontal portion 86 and the two cannot shift apart if quickly jerked to one side.

A fully engaged carrier 25 and rack 30 is shown in FIG. 10. The carrier 25 is therefore useful to transport the otherwise immobile rack 30 which is fully or partly loaded with saddles 80. Likewise, the carrier 25 is useful as a saddle transport device or saddle storage rack on its own.

As is readily apparent, the present invention presents numerous advantages for the groom. The saddle carrier 25 as shown in the Figures is useful for transporting up to three saddles. Additionally, each saddle rack 30 stores up to three saddles. However, one skilled in the art will recognize that the carrier 25 and rack 30 are easily adapted to transport/store more than three saddles by placing more saddle arm receiving horizontal support bars on the vertical portion of the rack 30 and/or the carrier 25. Once the saddle arms 40 of the saddle carrier 25 are removed, the carrier 25 engages with the saddle rack 30 in a forklift fashion and the rack 30 and carrier 25 are secured together by a locking mechanism 114. The carrier 25 is then used to transport the saddle rack 30.

When transporting a number of animals to equestrian shows the invention is particularly useful. Up to three saddles are placed on the rack 30 and the rack is transported into a van using the carrier 25. The carrier 25 and rack 30 are then disengaged, the saddle arms 40 are placed on the carrier 25 and up to three more saddles 80 are loaded onto the arms 40. Once loaded, the carrier 25 is then transported into the van. A support post 104 is optionally placed on each device to reduce jiggling of the saddle arms 40 during vehicular transport. Upon arriving at the destination the carrier 25 is transported off the van to the stable where the saddles 80 are unloaded and the saddle arms 40 are also removed from the carrier 25. Next the carrier 25 is engaged with the rack 30 as previously described and the saddle-laden rack 30 is transported into the stable. Due to the utilitarian design of the saddle carrier 25, the carrier 25 is also useful for transporting other objects such as buckets of water, oats, bales of hay or anything else necessary for the care of equines.

The present invention may also be used to transport saddles for pack animals other than horses. Thus, camel, burrow, or mule saddles may also be transported and stored on the present invention.

One skilled in the art will recognize that details of the previous embodiment may be varied without departing from the spirit and scope of the invention.

We claim:

1. A combination saddle carrier and saddle rack, comprising:
   a carrier having:
   a frame with a vertical portion, a horizontally extending portion attached to said vertical portion at a first side, and an axle support extending from an opposite side of the vertical portion as the horizontally extending portion,
   axle means for accepting at least one wheel, said axle means carried by the axle support at a position offset from the vertical portion of said frame, and
   means for attachment to the frame at a desired height on the vertical portion,
   a plurality of vertically arrayed saddle arm attachment means carried by the means for attachment at a desired height on the vertical portion
   a saddle rack, having:
   a vertical portion, a horizontally extending portion attached to said vertical portion, and a plurality of vertically arrayed saddle arm attachment means carried by the vertical portion, and means for engaging said rack with the saddle carrier whereby said horizontal portion of said carrier acts as a fork lift and slidably engages said horizontal portion of said rack at least one interchangeable saddle arm, the arm having an attachment end for attachment to any one of the plurality of saddle arm attachment means of the carrier and of the rack.

2. The combination saddle carrier and rack of claim 1 further comprising support means for supporting an end of said saddle arm opposite the attachment end.

3. The combination saddle carrier and rack of claim 2 wherein said support means is a telescoping post.

4. The combination saddle rack and carrier of claim 1 further comprising locking means for detachably connecting said saddle rack to said carrier.

5. The combination saddle rack and carrier of claim 1 further comprising a rear support system on said carrier, the rear support system including a bar extending rearwardly from a first location on the vertical portion and a gusset extending rearwardly from a second location on the vertical portion and wherein the bar and the gusset are connected at a third location offset from the vertical portion.

6. A saddle carrier comprising:

a frame having a vertical portion defining a forward side and a rearward side, a horizontal portion extending from said forward side of said vertical portion and an axle support extending from the rearward side of the vertical portion;

an axle supported by the axle support and having spaced apart wheels;

a plurality of saddle arms suitable for receiving saddles connected to said vertical portion and extending on said forward side of said frame;

a rack which is slidably engagable with said carrier, said rack comprising:

a frame having a vertical portion with a forward and rearward side and a horizontal portion extending from said forward side of said vertical portion, saddle arms suitable for receiving saddles, and saddle arm support means for accepting and supporting said saddle arms in an extended position on said forward side of said vertical portion.

7. The saddle carrier of claim 6 wherein said saddle arms include an interchangeable attachment end and the rack and carrier each include a plurality of vertically arrayed saddle arm attachment means carried by the vertical portions.

8. The saddle carrier of claim 6 further comprising a locking means for maintaining engagement of said saddle carrier with said saddle rack.

9. The saddle carrier of claim 6 wherein said sliding engagement between said carrier and said rack occurs between said horizontal portions of said rack and said carrier wherein said horizontal portion of said carrier slides underneath said horizontal portion of said rack in a forklift fashion.

10. A combination saddle carrier and rack, comprising:

a carrier having:

a frame with a vertical portion and a horizontally extending portion attached to said vertical portion, axle means, attached to the frame, for accepting spaced apart wheels, and saddle arm support means attached to said vertical portion, said support means for accepting at least one saddle supporting arm, a saddle rack, having:

a vertical portion, a horizontally extending portion attached to said vertical portion, and means for connecting at least one saddle arm to the saddle rack vertical portion, and means for interconnecting said saddle carrier and rack.

11. The combination saddle carrier and rack of claim 10 wherein the frame includes an axle support extending rearwardly from the vertical portion of the frame and wherein said axle is carried by the support in an offset position from the vertical portion of said frame.

12. The combination saddle carrier and rack of claim 10 wherein said carrier further comprises height-adjustable saddle arm support means.

13. The combination saddle carrier and rack of claim 10 wherein said rack includes means for detachably accepting a plurality of saddle arms.

14. The combination saddle carrier and rack of claim 10 wherein said means for engaging said saddle carrier and rack comprises said horizontal portion of said carrier slidably engaging said horizontal portion of said rack.

15. The combination saddle carrier and rack of claim 10 further comprising a support means for supporting an end of the saddle arm on the carrier vertical portion opposite an end of said saddle.

16. The combination saddle carrier and rack of claim 15 wherein said support means is a telescoping post.

17. The combination saddle rack and carrier of claim 10 further comprising a locking means for detachably connecting said saddle rack to said carrier.

18. The combination saddle rack and carrier of claim 10 further comprising a rear support system on said carrier, the rear support system including a bar extending rearwardly from a first location on the vertical portion and a gusset extending rearwardly from a second location on the vertical potion and wherein the bar and the gusset are connected at a third location offset from the vertical portion.

19. A saddle carrier, comprising:

a carrier frame having a vertical portion defining a forward side and a rearward side, a horizontal portion extending from the forward side of the vertical portion, and an axle support extending from the rearward side of the vertical portion of the frame;

an axle carried by the axle support at a position offset from the rearward side of the vertical portion of the frame, which axle has at least one wheel;

means for height adjustable attachment connected to the vertical portion of the frame;

a ladder-like portion, including a plurality of rungs, carried by the height adjustable attachment means;

a rack which is slidably engagable with the carrier, the rack including a rack frame having a vertical portion with a forward and a rearward side and a horizontal portion extending from the forward side of the vertical portion, and a second ladder-like portion attached to the vertical portion of the forward side of the rack, the second ladder-like portion including a second plurality of rungs; and at least one detachable saddle arm having means for selective attachment to the first and second plurality of rungs and a saddle receiving surface projecting from the means for selective attachment.

20. The saddle carrier of claim 19 further comprising a locking means for maintaining engagement of said saddle carrier with said saddle rack.

21. The saddle carrier of claim 19 wherein said sliding engagement between said carrier and said rack occurs between said horizontal potions of said rack and said carrier wherein said horizontal portion of said carrier slides underneath said horizontal portion of said rack.

* * * * *